Dec. 2, 1941.  R. H. PARK  2,265,003
SKEIN HOLDER
Filed Sept. 30, 1939  2 Sheets-Sheet 1

INVENTOR.
ROBERT H. PARK,
BY John W. Lee
ATTORNEY.

Dec. 2, 1941.   R. H. PARK   2,265,003
SKEIN HOLDER
Filed Sept. 30, 1939   2 Sheets-Sheet 2

INVENTOR.
ROBERT H. PARK,
BY John M. Lee
ATTORNEY.

Patented Dec. 2, 1941

2,265,003

UNITED STATES PATENT OFFICE 2,265,003

SKEIN HOLDER

Robert H. Park, Millington, N. J., assignor, by mesne assignments, to American Cyanamid Company, New York, N. Y., a corporation of Maine Application September 30, 1939, Serial No. 297,222

6 Claims. (Cl. 242—127)

This invention relates to skein holders and accessory apparatus, particularly for use with flicker type recording spectrophotometers or colorimeters.

In the past, great forward steps have been made in spectrophotometry by the recording flicker type spectrophotometer such as those described in the patents to Pineo, No. 2,107,836, issued February 8, 1938, and No. 2,126,410, issued August 9, 1938. These devices permit reducing to graphic form the spectral absorption of various colored materials rapidly and simply. They are, however, open to certain inherent inaccuracies. Thus, for example, when dealing with a reflectance sample of non-uniform surface, such as for example a skein of yarn, readings are not always accurate for several reasons. In the first place, it is almost impossible to produce a sample surface of yarn which is entirely homogeneous and it is even more difficult to produce such a surface which is homogeous in respect to reflection of light. Hence varying results are obtained when the sample is moved or displaced. This introduces an inaccuracy which is of fundamental importance.

It would be a relatively simple matter to obtain a uniform surface for a yarn sample if the yarn were wound on a drum which was then rotated rapidly with respect to the speed of recorder pen motion so that the reflectance would be an average and hence non-uniform reflectance of individual portions would be cancelled out. In fact, attempts have been made in the past to measure colored skeins of yarn in the spectrophotometer by this means. They are not, however, practical because of the excessive time required to untangle the skein in order to wind yarn on a drum.

The present invention relates to a skein holder on which a skein can be rapidly placed without untangling the skein or winding it onto the holder. The holder is also of such shape that it can be fitted on a rotating device and rapidly rotated in front of the sample aperture or window of a flicker type spectrophotometer.

The invention will be described in greater detail in conjunction with the drawings in which.

Figure 1:
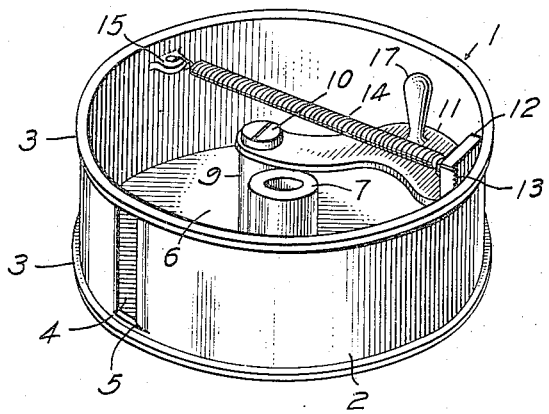
Fig. 1 is a perspective elevation of one form of the skein holder according to the present invention.

The skein holder consists of a drum 1 having a recessed polished face 2 preferably chromium plated and flanges 3 at the top and bottom. The recessed face has a slot or opening 4 the sides of which are cut at an angle as indicated at 5. One side of the drum 1 has a head 6 which supports a bearing 7 adaptable for rotating on or with a shaft. When a skein of yarn is wrapped around the drum 1 along the recessed face 2 and the ends 8 drawn through the slot or opening 4, the angle of the opening or slot walls 5 causes the yarn to assume a smooth surface and appear as if it had been wound onto the drum. The flanges 3 prevent the yarn from slipping off the drum.

Figs. 1, 2, 3, 4, and 5 show one method of holding the yarn taut on the face of the drum. A support 9 mounted on and extending upward from the drum head 6 a distance slightly greater than the height of bearing 7 is internally threaded to receive a screw 10 which holds the arm 11 in such a manner that the arm can move horizontally as regards the support 9. The opposite end of the arm 11 has a vertical plate 12 which is approximately equal in length to the width of the inner wall of the drum 1. The side of the vertical plate 12 nearest the slot 4 has a thin vertical plate 13 with saw teeth. A spring 14 is fastened at one end to anchor 16 on the vertical plate 12. The arm 11 is equipped with a handle 17.

Figure 4:
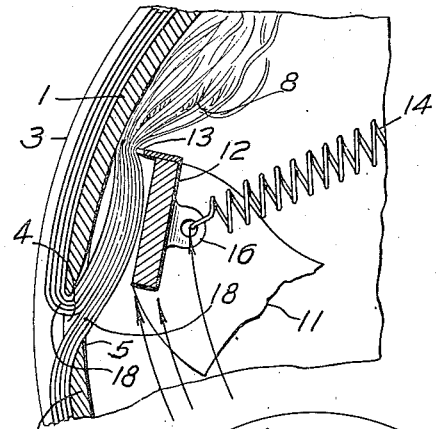
Fig. 4 is an enlarged view in horizontal section of the skein locking mechanism of Figs. 1, 2 and 3.
Figure 2:
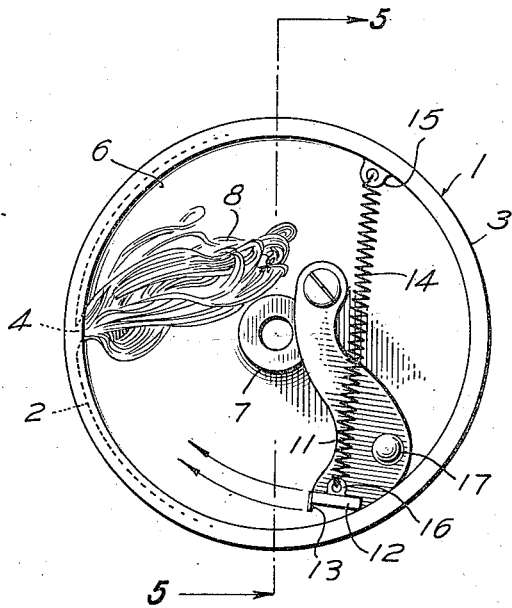
Fig. 2 is a horizontal elevation of the skein holder of Fig. 1 with a skein arranged thereon prior to locking in position.
Figure 3:
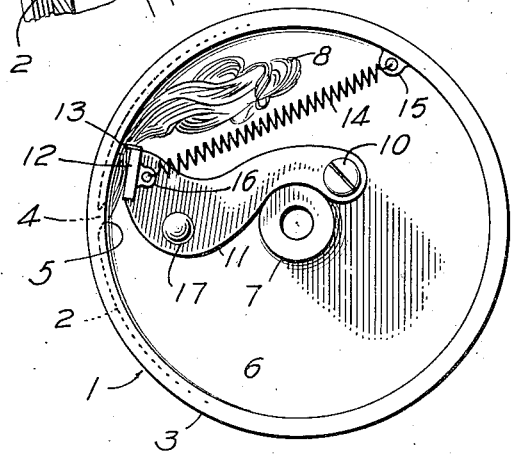
Fig. 3 is a horizontal elevation of the skein holder of Fig. 1 with a skein arranged thereon and locked in position.
Figure 5:
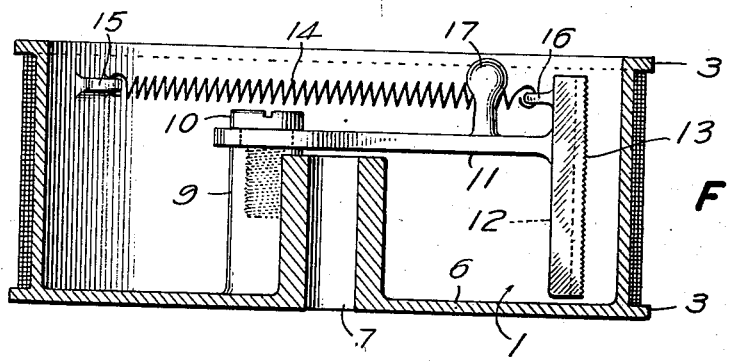
Fig. 5 is a vertical section through the skein holder taken along the line 5—5 of Fig. 2.

In using the skein holder of Fig. 1 a skein of yarn is wrapped around the polished recessed face 2 of the drum and the two ends 8 of the skein are drawn through the opening or slot 4. While this is being done, the arm 11 is held in the non-operative position indicated in Fig. 2 by the spring 14. The ends of the skein 8 are drawn taut causing the individual strands of the skein to lie close to the recessed face 2 of the drum 1 giving the appearance of having been wound thereon. By means of the handle 17 the arm 11 is moved towards the opening or slot 4 whereupon the spring 14 forces the saw-toothed edge 13 of the vertical plate 12 to engage the ends 8 of the skein and hold them firmly against the inner wall of the drum 1 as indicated in Figs. 3 and 4.

Figure 6:
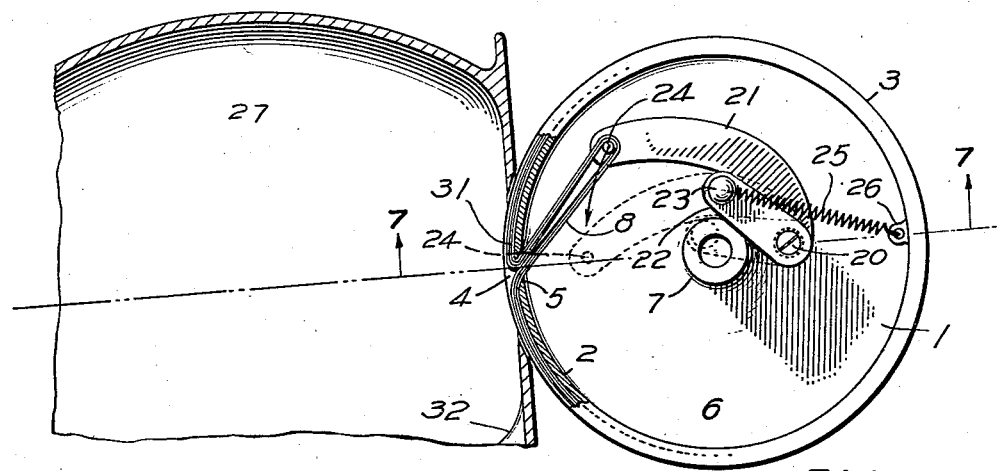
Fig. 6 is a plan view of a second form of skein holder shown in example with a horiozntal section of a spectrophotometer integrating sphere.
Figure 7:
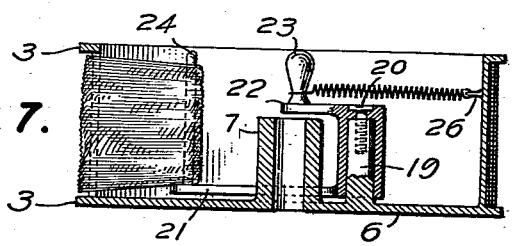
Fig. 7 is a vertical section through the skein holder of Fig. 6 taken along the line 7—7.
Figure 8:
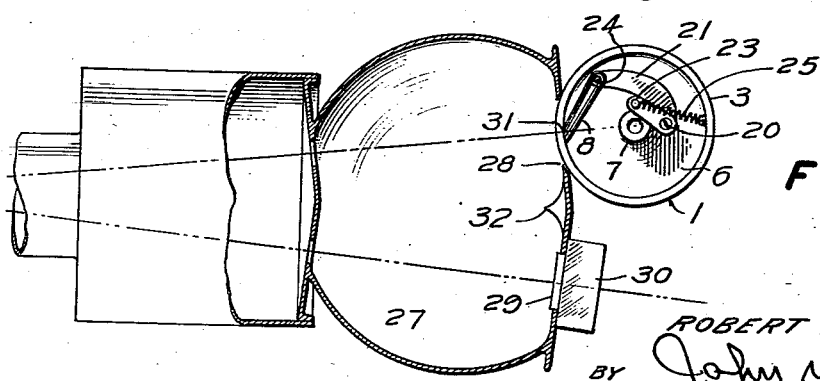
Fig. 8 is an example of the spectrophotometer integrating sphere and skein holder of Fig. 6 in position being partly in horizontal section and partly in plan view.

In Figs. 6, 7, and 8, a second method of holding the skein tightly against the face of the drum is shown in which the support 19 extending upwardly from the drum head 6 has mounted thereon and held by the screw 20 a single member having a pair of laterally extending arms 21 and 22 mounted in such a manner that they can rotate around the support 19. The laterally extending arm 21 extends from near the bottom of support member 19 along the drum head 6 to a distance near the inside surface of the drum 1 and has a projecting pin 24 near the end. The laterally extending arm 22 extends from near the top of support member 19 in the same general direction as arm 21 but at a slight angle thereto and approximately one-half as long. The outer end of arm 22 has handle member 23 to which one end of the spring 25 is made fast, the other end of the spring being made fast to anchor 26 on the inner surface of the drum 1.

When a skein of yarn is wrapped around the recessed face 2 of drum 1 and the ends drawn through the opening or slot 4, it may be held tightly against the face of the drum as shown in Figs. 6, 7, and 8 by slipping the ends of the skein 8 over the pin 24 on the arm 21 and the arms 22 and 21 moved in the direction indicated in Figs. 6 and 8 whereupon the action of spring 25 holds the yarn taut.

Fig. 8 shows an integrating sphere 27 of a typical flickering type spectrophotometer having a sample window 28 and a standard window 29, a block of standard white magnesium carbonate 30 covers the window 29. Substantially the whole of the light reflected from the sample should impinge on the whitened sphere walls. This necessitates a projection of the skein holder for some small distance into the integrating sphere as shown in Figs. 6 and 8. There is accordingly some possibility that light from the white standard 30 might be reflected directly across to the sample 31. Such cross reflection affects the accuracy of the instrument. To prevent it and improve the accuracy there is provided a projection or fin 32 on the integrating support wall projecting sufficiently far to cut off direct reflection from standard to sample and vice-versa.

In operation the spectrophotometer is operated in the normal manner and the skein holder is rapidly rotated by means of a shaft through the bearing 7 from any suitable source of power (not shown). The rotation of the skein holder is preferably made sufficiently rapid with respect to the rate of recording pen motion so that the reflectance of the skein on its surface is averaged out.

It is an advantage of the present invention that skeins of yarn can be loaded onto a skein holder not only rapidly but with a high degree of uniformity. The strands of the skein are easily arranged around the outer surface 2 of the drum and held tightly thereon. The uniformity of the skein surface on the drum is comparable to that obtained by painstaking unwinding by hand a skein and winding it onto a drum. This is an advantage not only because it enables obtaining reproducible data, but because there is also a saving of time without any sacrifice of accuracy.

It is a further advantage that the skein is easily removed from the drum without unwinding or cutting and may be preserved intact for further reference.

The present invention is not limited to the particular mechanical designs shown in the description of the invention, but broadly includes any means to clamp or hold the skein ends after insertion through the slot in the drum so that the tension holds the skein tightly against the surface of the drum or skein holder.

What I claim is:

1. A skein holder for holding a skein of yarn for spectrophotometric measurements comprising a drum having a slot adapted to receive a loop of the skein and means positioned inside the drum for fastening the loop so that the skein is held tightly against the outer surface of the drum.

2. A skein holder for holding a skein of yarn for spectrophotometric measurements comprising a drum having a narrow slot adapted to receive a loop of the skein and means positioned inside the drum for applying tension to the loop whereby the skein is held tightly against the outer surface of the drum.

3. A skein holder for holding a skein of yarn for spectrophotometric measurements comprising a drum having a slot of sufficient size to permit drawing of skein ends therethrough and means positioned inside the drum for holding the skein ends firmly against the inner surface of the drum so that the skein is held tightly against the outer surface of the drum.

4. A skein holder for holding a skein of yarn for spectrophotometric measurements comprising a drum having a recessed external surface with an upper and a lower flange, the said recessed external surface having a slot of sufficient size to permit drawing the skein ends therethrough and means positioned inside the drum for holding the skein ends so that the skein is held tightly against the recessed external surface of the drum.

5. A skein holder for holding a skein of yarn for spectrophotometric measurements comprising a drum having a recessed external surface with an upper and a lower flange, the said recessed external surface having a slot of sufficient size to permit drawing the skein ends therethrough and means positioned inside the drum for holding the skein ends firmly against the inner surface of the drum so that the skein is held tightly against the recessed external surface of the drum.

6. A skein holder for holding a skein of yarn for spectrophotometric measurements comprising a drum having a recessed external surface with an upper and a lower flange, the said recessed external surface having a slot of sufficient size to permit drawing the skein ends therethrough and means positioned inside the drum for applying tension to the skein ends so that the skein is held tightly against the recessed external surface of the drum.

ROBERT H. PARK.